(12) United States Patent
Mosadegh et al.

(10) Patent No.: US 10,639,801 B2
(45) Date of Patent: May 5, 2020

(54) LOW STRAIN PNEUMATIC NETWORKS FOR SOFT ROBOTS

(71) Applicant: President and Fellows of Harvard College, Cambridge, MA (US)

(72) Inventors: Bobak Mosadegh, Boston, MA (US); Robert F. Shepherd, Brooktondale, NY (US); George M. Whitesides, Newton, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 1218 days.

(21) Appl. No.: 14/464,396

(22) Filed: Aug. 20, 2014

(65) Prior Publication Data
US 2015/0266186 A1  Sep. 24, 2015

Related U.S. Application Data

(60) Provisional application No. 61/867,845, filed on Aug. 20, 2013.

(51) Int. Cl.
*B25J 15/00* (2006.01)
*B25J 9/14* (2006.01)
(Continued)

(52) U.S. Cl.
CPC .......... *B25J 15/0023* (2013.01); *B25J 9/142* (2013.01); *B25J 15/12* (2013.01); *B25J 18/06* (2013.01); *B29C 65/70* (2013.01); *F15B 15/08* (2013.01); *F15B 15/103* (2013.01); *B29L 2009/00* (2013.01)

(58) Field of Classification Search
CPC ........ F15B 15/12; F15B 15/103; F15B 15/08; B25J 15/12; B25J 18/06; B25J 9/142; B25J 15/0023; B29C 65/70
See application file for complete search history.

(56) References Cited

U.S. PATENT DOCUMENTS 4,784,042 A * 11/1988 Paynter ................. B25J 9/142
  414/7
2002/0157388 A1  10/2002  Seto et al.
(Continued)

FOREIGN PATENT DOCUMENTS

WO  WO-2012/148472 A2  11/2012
WO  WO-2013/110086 A1  7/2013

OTHER PUBLICATIONS

Brown, E., et al., Universal robotic gripper based on the jamming of granular material. Proceedings of the National Academy of Sciences, 2010, 5 pages.
(Continued)

*Primary Examiner* — Abiy Teka
(74) *Attorney, Agent, or Firm* — Wilmer Cutler Pickering Hale and Dorr LLP

(57) ABSTRACT

An actuator includes a plurality of chambers comprised of an extensible material, the chambers having interior side walls and exterior walls, wherein at least a portion of the interior side wall is separated from an interior side wall of an adjacent chamber; and a strain limiting base; and a channel that fluidically interconnects the plurality of chambers, wherein the interior walls are configured to be more compliant than the exterior walls.

32 Claims, 15 Drawing Sheets

(51) Int. Cl.
*B25J 18/06* (2006.01)
*B25J 15/12* (2006.01)
*F15B 15/10* (2006.01)
*B29C 65/70* (2006.01)
*F15B 15/08* (2006.01)
*B29L 9/00* (2006.01)

(56) References Cited

U.S. PATENT DOCUMENTS

2003/0110938 A1* 6/2003 Seto .................. B25J 9/142
  92/92
2012/0216672 A1   8/2012 Menon et al.
2014/0109560 A1* 4/2014 Ilievski .................. B25J 9/1075
  60/327

OTHER PUBLICATIONS

Chou, C.P. and B. Hannaford, Measurement and modeling of McKibben pneumatic artificial muscles. IEEE Transactions on Robotics and Automation, 1996. 12(1): p. 90-102.
Ilievski, F., et al., Soft robotics for chemists. Angew Chem Int Ed Engl, 2011. 50(8): p. 1890-5.
International Search Report and Written Opinion dated Apr. 16, 2015, in the International application No. PCT/US14/51818, filed Aug. 20, 2014, 13 pages.
Kim, M.S., et al., Manufacturing of inchworm robot using shape memory alloy (SMA) embedded composite structure. International Journal of Precision Engineering and Manufacturing, 2011. 12(3): p. 565-568.
Lee, H., C.G. Xia, and N.X. Fang, First jump of microgel; actuation speed enhancement by elastic instability. Soft Matter, 2010. 6(18): p. 4342-4345.
Martinez, R.V., et al., Elastomeric Origami: Programmable Paper-Elastomer Composites as Pneumatic Actuators. Advanced Functional Materials, 2012. 22(7): p. 1376-1384.
Martinez, R.V., et al., Robotic tentacles with three-dimensional mobility based on flexible elastomers. Adv Mater, 2013. 25(2): p. 205-12.
Morin, S.A., et al., Camouflage and display for soft machines. Science, vol. 337, No. 6096, Aug. 17, 2012, pp. 828-832.
Otake, M., et al., Motion design of a starfish-shaped gel robot made of electro-active polymer gel. Robotics and Autonomous Systems, 2002. 40(2-3): p. 185-191.
Shepherd, R.F., et al., Multigait soft robot. Proc Natl Acad Sci U S A, 2011. 108(51): p. 20400-3.
Shepherd, R.F., et al., Using Explosions to Power a Soft Robot. Angew Chem Int Ed Engl, vol. 52, pp. 2892-2896, 2013.
Shi, L.W., et al., A Novel Soft Biomimetic Microrobot with Two Motion Attitudes. Sensors, 2012. 12(12): p. 16732-16758.
Wakimoto, S., K. Suzumori, and K. Ogura, Miniature Pneumatic Curling Rubber Actuator Generating Bidirectional Motion with One Air-Supply Tube. Advanced Robotics, 2011. 25(9-10): p. 1311-1330.

* cited by examiner

A					B

A                    B

A       Single-Molded

B       Double-Molded

LOW STRAIN PNEUMATIC NETWORKS FOR SOFT ROBOTS

CROSS-REFERENCE TO RELATED APPLICATION

This application claims benefit of the earlier priority date of U.S. Provisional Patent Application No. 61/867,845, entitled "LOW STRAIN PNEUMATIC NETWORKS FOR SOFT ROBOTS," filed on Aug. 20, 2013, which is hereby incorporated by reference herein in its entirety.

STATEMENT REGARDING FEDERALLY SPONSORED RESEARCH OR DEVELOPMENT

The present invention was made with United States government support under DARPA Grant No. W911NF-11-1-0094. United States government may have certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to soft robotics. In particular, this invention relates to a low strain soft robotics.

BACKGROUND

A robot is an example of a controlled programmable device capable of executing mechanical or electrical tasks. Robots have replaced human in performing those repetitive and dangerous tasks which humans prefer not to do, or are unable to do due to size limitations or the extreme environments. Robotics deals with the design, construction, operation, and application of robots, as well as computer systems for their control, sensory feedback, and information processing.

Soft robotic technologies are appealing for locomotion, and for manipulation of fragile or irregularly shaped objects; their potential to bring new capabilities to the field of robotics stems from the compliant materials of which they are fabricated, the simplicity of their actuation, and their potential for low cost. Soft actuators have been fabricated from a variety of materials (polymers, elastomers, hydrogels, granules) and operate with several different modes of actuation, e.g., pneumatic, hydraulic, electric and chemical modes of actuation.

Pneumatically powered elastomeric actuators are appealing because these structures are light weight, inexpensive, easily fabricated, and provide linear or non-linear motion with simple inputs. One type of composite soft robotic actuators is based on a pneumatic network design that comprises mm-scale channels embedded in an extensible elastomeric layer with an inextensible layer made of either a stiffer elastomer or the same elastomer embedded with a fabric. See International Application No. PCT/US2011/061720, filed Nov. 21, 2011. Upon pressurization of a single inlet, the pneumatic network actuator bends, and provides motion analogous to several hard actuators connected in series. Bending of the serially connected pneumatic network actuators occur by the straining of the top wall of the chamber, allowing the inside walls to deflect away from each other at the interface of the inextensible layer (similar to a hinge).

Pneumatic actuators powered by compressed-air can generate complex motions, however, most of these motions have, thus far, been slow (on the order of seconds) to achieve their maximum amplitude. Rates of actuation are limited by the large changes in internal volume required to achieve the full range of motion of the actuator, and therefore by the rate at which low-pressure gas can be transported through the tube connecting the actuator to a gas source. Pneumatic networks (networks of small channels embedded in elastomeric structures that can be inflated with air) usually require significant changes in volume ($\Delta V/V > 3$) to achieve their full range of bending. This requirement for large $\Delta V/V$ limits the performance of soft actuators that use pneumatic networks in three ways: i) it requires the transfer of large volumes of gas for actuation, (and as a result, limits rates of actuation to low values), ii) it generates a change of volume of the actuator that is significant (and as a result, requires that the system have large volumes in which to operate), and iii) it imposes high strains on the material of which the pneumatic network is fabricated (and, as a result, shortens the operating lifespan of the pneumatic networks).

Improvements to soft robotic design are therefore needed.

SUMMARY

Pneumatic network actuators for use as soft robots are described.

In one aspect, an actuator includes a plurality of chambers comprised of an extensible material, the chambers having interior side walls and exterior walls, wherein at least a portion of the interior side wall is separated from an interior side wall of an adjacent chamber; a strain limiting base; and a channel that fluidically interconnects the plurality of chambers, wherein the interior walls are configured to be more compliant than the exterior walls.

In one or more embodiments, he exterior walls include exterior side walls having a thickness that is greater than the thickness of the interior side walls.

In one or more embodiments the exterior walls include top walls having a thickness that is greater than a thickness of the interior side walls.

In one or more embodiments, the exterior walls are made from materials having a greater stiffness than the interior side walls.

In any of the preceding embodiments, the base can include an inextensible, flexible layer.

In any of the preceding embodiments, the base can include an inextensible layer embedded in a layer of flexible polymer, and for example, the inextensible layer can be paper, fabric or polymer film, and for example, the paper or fabric is provided as a matted sheet, woven sheet or fibers aligned along the length of the base.

In one or more embodiments, the base comprises an extensible, flexible material that is configured and arranged to be stiffer than the exterior walls of the chambers.

In any of the preceding embodiments, the plurality of chambers is made up of an elastomer.

In any of the preceding embodiments, the actuator is powered by pressure provided by a gas or liquid source.

In any of the preceding embodiments, the pneumatic or hydraulic channel is positioned between the interior side wall of the plurality of chambers, or the pneumatic or hydraulic channel is located in the strain limiting base and is positioned and arranged to fluidically connect the plurality of chambers.

In any of the preceding embodiments, the actuator further includes an inlet port for receiving a pressurizing fluid.

In another aspect a method of actuation includes providing an actuator according to any the embodiments noted herein; and pressurizing the actuator to cause the actuator to move from a first resting position to a second actuated position.

In one or more embodiments, pressurizing causes the interior side walls to expand preferentially.

In any of the preceding embodiments, the actuation occurs in less than 1 second, or the actuation occurs in less than 250 msec, or the actuation occurs in less than 100 msec.

In any of the preceding embodiments, the actuation is greater than 1 m/sec.

In any of the preceding embodiments, the actuator undergoes a circumferential-expansion of less than 3% during actuation In any of the preceding embodiments, the actuator undergoes an energy loss of less than 10% between the actuated and unactuated state In any of the preceding embodiments, the actuator can be cycled more than 10000 times without failure, or the actuator can be cycled more than 200000 times without failure, or actuator can cycle more than one million times without failure.

In any of the preceding embodiments, the frequency of actuation is greater than 1 Hz, or the frequency of actuation is greater than 2 Hz.

In any of the preceding embodiments, the actuator bends along a roughly circular trajectory below a threshold actuation rate and the tip of the actuator bends preferentially, causing the actuator to curl on itself above a threshold actuation rate.

In another aspect, a method of making an actuator includes molding an extensible layer comprising a plurality of chambers comprised of an extensible material, the chambers having interior side walls and exterior walls, wherein at least a portion of the interior side wall is separated from an interior side wall of an adjacent chamber; molding a strain limiting layer comprises of a material having a greater stiffness than the extensible layer; and joining the extensible layer to the strain limiting layer at predetermined locations to define chambers having a pneumatic channel that fluidically interconnects the plurality of chambers.

Pneumatic network actuators having freestanding chambers can achieve high actuation speeds (>1 m/s) and reliable long-term operation. Pneumatic network actuators having freestanding chambers have improved actuation efficiency at a given pressure by almost 10× in terms of bending angle, by 50% in terms of force, 30× in terms of lost energy, and over 1000× the number of actuation cycles as compared to comparably dimensioned pneumatic network actuators having embedded chambers. Pneumatic chambers having freestanding chambers exhibit lower fatigue of the component polymer materials that allows for a longer lifetime of the actuator.

The advantages of these actuators are that they can easily have multiple bending points which actuate by pressurization or passively bend by an external force; these properties can be useful for positioning sensitive interlocking objects in an assembly line. In addition, these materials are soft, and resistant to damage by impact or pressure. Because they are also inexpensive, they can be routinely replaced, or used in high numbers. The design improves speed, force, energy consumption, and fatigue, all of which are factors for commercial applications of soft robotic actuators. This rapid motion and dependability is useful for many applications such as those in automated assembly lines, and for mobile and agile robots for search and rescue operations.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

DETAILED DESCRIPTION

Figure 1:
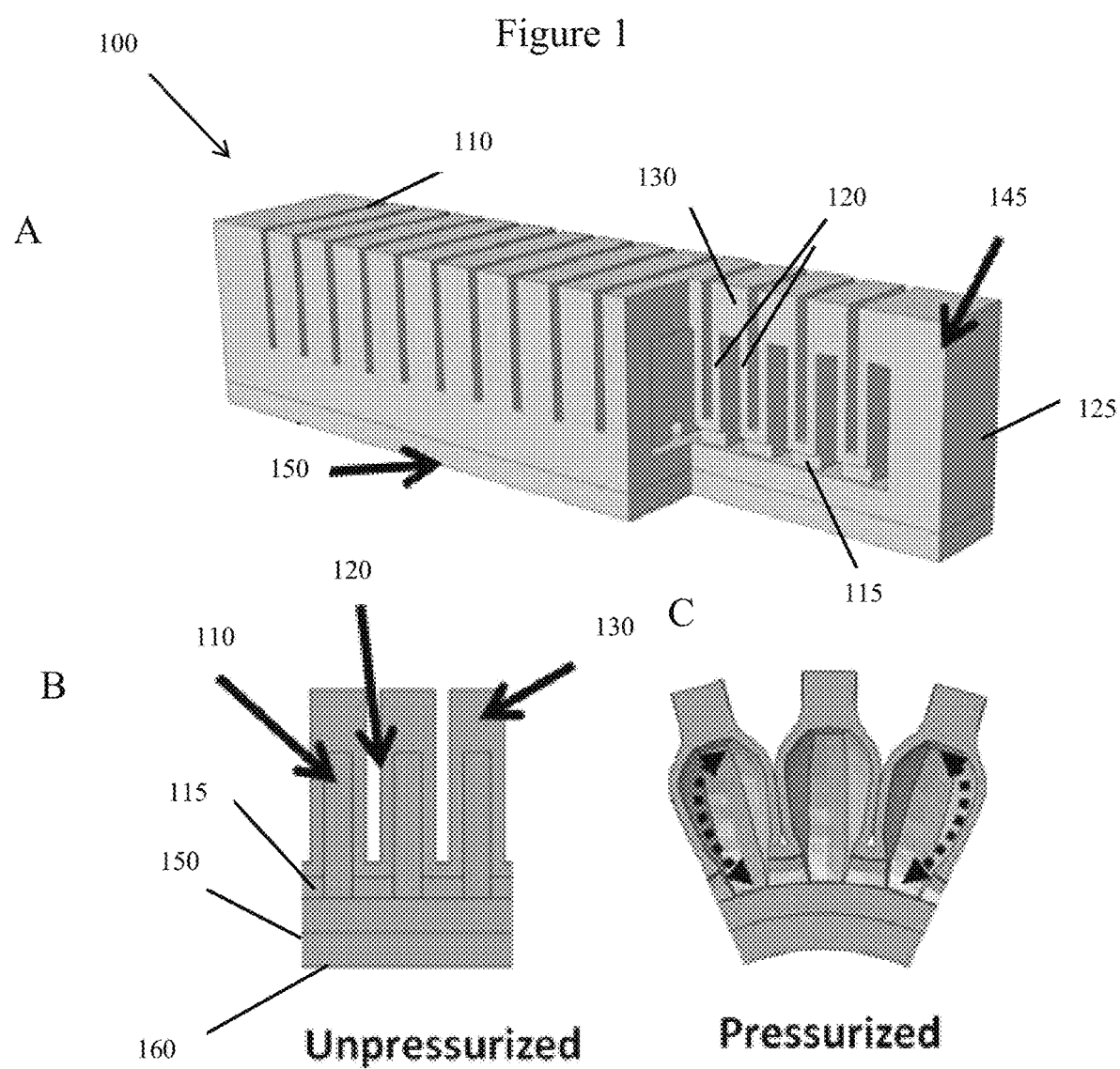
FIG. 1 is a schematic representation of (A) a low strain pneumatic network according to one or more embodiments having an extensible top layer and inextensible paper-embedded bottom layer; (B) is an expanded view of a portion of the pneumatic network in cross-section showing that the interior walls of the network are freestanding for each chamber; and (C) is a schematic illustration of a freestanding art pneumatic network in cross-section showing expansion regions during pressurization, indicated by arrows.

Soft robots capable of rapid pneumatic activation and having low fatigue are described. A simple actuator can bend from a linear shape to a quasi-circular shape in 50 milliseconds when pressurized with a pressure of $\Delta P=345$ kPa. When inflated fully, the channels and chambers of this new design for a pneumatic network experience only one-tenth the change in volume of that required for a motion of equal amplitude using a design involving embedded chambers. This small change in volume requires comparably low levels of strain in the material at maximum amplitudes of actuation, and this has low rates of fatigue and failure. This actuator can operate over a million cycles without significant degradation of performance. This design for actuators for soft robots combines high rates of actuation with high reliability of the actuator, and opens new areas of application for them.

The pneumatic network design decreases the amount of strain on the material required for full amplitude motion of these actuators. In one or more embodiments, the pneumatic network contains separate walls for every chamber of the soft bodied device to control the expansion of the elastomeric walls and to thereby improve the efficiency of actuation. The efficiency of bending is improved by reducing the stiffness of the freestanding interior walls of the chamber relative to the external walls, thereby requiring less pressure to achieve full motion of the actuator. It has been surprisingly determined that when the walls of the chambers are all uniform, they experience higher fatigue and are susceptible to failure due to excessive strain experiences during expansion of the chambers. By providing interior side walls that are thinner than the exterior walls of the pneumatic chambers, the amount of strain experienced by the device during activation can be reduced, thereby reducing fatigue and corresponding failure, as well as increasing the speed of actuation.

The low strain, rapid actuation pneumatic network includes an extensible top layer and inextensible bottom layer. The soft robots include a plurality of unsupported chamber or "freestanding" chambers secured to a common strain limiting layer along one face. The unsupported chamber does not share a common wall along the at least a portion of the length of the side wall. The chambers can be "detached", that is, the chamber does not share any portion of its side wall with its neighboring chambers, or "semi-detached", that is, a chamber shares a portion of its side wall with its neighboring chambers. In other embodiments, the pneumatic network can be described as being a 'double-contoured' pneumatic network, because the contour of the upper surface and lower surface are different. The chambers are fluidically connected, for example, through a pneumatic conduit located in the base containing the strain limiting layer or in the side walls of the chambers. Soft robots possessing a plurality of detached, semi-detached or freestanding chambers secured to a common strain limiting layer along one face can be pressurized to provide large and versatile actuation to soft elastomers. The interior side walls are designed to be more compliant than the exterior walls. In one or more embodiments, the exterior walls are thicker than the interior side walls. In one or more embodiments, the exterior walls are made of a stiffer material than the interior side wall to obtain a more compliant interior side walls. Therefore, an increase in the internal pressure preferentially expands the inside walls and minimizes the strain that occurs on the other exterior walls. In addition, the close proximity of two neighboring chambers causes the expanding inside walls to push against each other, and results in a preferential elongation of the extensible layer, with only small changes (<1%) in the height of this layer. While described below for use with pneumatic activation, it is recognized that the device may be used with hydraulic activation. The response times may be longer for hydraulic activation.

The principle of pneumatic actuation according to one or more embodiments is illustrated in FIG. 1. FIG. 1A is a perspective view of a low strain soft robot 100 having 15 chambers 110, and including a cut-away section demonstrating the device interior. FIG. 1B is a cross-sectional view of a section of the device. The actuator includes a plurality of freestanding chambers 110 secured to a common base 150. The chambers 110 are unsupported; each has interior side walls that are not connected to the side walls of its neighboring chambers. In one or more embodiments, the side walls have greater than 25%, or greater than 50% or greater than 75% of its surface area that is not connected. The chambers 110 are fluidically connected, for example, through a conduit 115 located near the base of the chamber. The chambers 110 have interior side walls 120, exterior side walls 125, and top walls 130. In one or more embodiments, the exterior walls are stiffer than interior walls. For example, the top wall 130 has a thickness that is greater than the thickness of the interior side walls 120. In other embodiments, the chamber may contain external walls 125, 145 that are thicker than the internal side walls of the chambers. The greater stiffness of the exterior walls and the increased extensibility of the interior walls also may be accomplished by using different materials for exterior and interior walls. Chamber 110 shares a pneumatic conduit 115 that fluidically interconnects the plurality of chambers. The conduit 115 can be located in the base containing the inextensible layer. In other embodiments, the conduit 115 can be molded into the side walls of the upper extensible layer. The chambers are secured to an inextensible or strain limiting layer 150 that resists expansion when the chambers are pressurized. The chambers can optionally contain a floor that is integral with the walls and top of the chamber that is secured to the inextensible base. In other embodiments, the side walls of the chamber are secured directly to the strain limiting base. The chambers, including an optional floor can be considered collectively as the 'extensible layer.' The extensible layer is typically formed as a single molded body and typically is prepared from an extensible or stretchable material, such as elastomer.

The extensible layer is connected to a strain limiting base 150 including a stiffer, yet still pliable backing layer 160. The stiffer backing layer may be a material having a higher elastic modulus than the chambers. The high modulus material can be used for the base where inflation is undesirable, while a low elastic modulus material can be used for the chambers where extensibility is needed. Alternatively, the stiffer backing layer may include an inextensible backing material, such as paper or fabric, embedded in the base. In such cases, the base and chambers can be made of the same or different materials.

Upon pressurization of the chambers through the pneumatic conduit 150, the soft-elastomer network expands as shown in FIG. 1C. When pressurized, the chambers expand in such a way that the restoring pressure is uniformly distributed; thus, most of the expansion occurs in the most compliant regions, that is along internal sides walls 120. Since the interior side walls are thinner than the top and exterior side walls, the interior side walls will expand to the greater extent. To accommodate the increased volume that results when the chambers expand like balloons, the structure bends in response. The soft-rubber's expansion is accommodated by bending around the stiffer, strain limiting layer. The dashed arrows in FIG. 1C signify expanding regions when the actuator is pressurized. Because the top walls of the chambers are thicker than the side walls, extension is substantially limited to the side walls, as is illustrated in FIG. 1C. Expansion energy is not expended unnecessarily to expand the top wall. Thus, the side wall presses outward and the full pressure of the expansion is exerted laterally against the neighboring side wall. The pneumatic network requires only a relatively small strain (and thus a small transfer of gas) for large amplitude motion. Therefore, applications with limitations on the flow rate of gas will achieve faster (>1 m/s) actuation using the freestanding chamber design according to one or more embodiments. Similarly, actuations will apply less pressure and therefore less strain to the device in order to achieve an actuation response. Over multiple actuations, this translates into less fatigue and greater life expectancy for the device.

Figure 2:
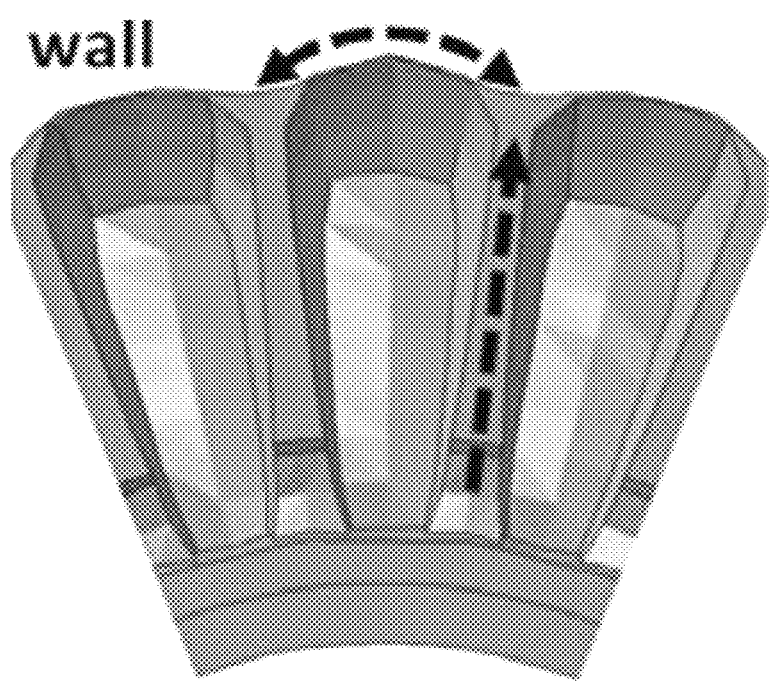
FIG. 2 is a schematic illustration of a prior art pneumatic network in cross-section showing expansion regions during pressurization, indicated by arrows.

In comparison, in a pneumatic network in which the channels are embedded in a single elastomeric block in which the chambers share interior walls, the expansion force is applied to a great extent to the top wall, as is illustrated in FIG. 2. In FIG. 2, the arrows indicate the expansion regions and show that the side walls expand both vertically and laterally and that the top wall also expands. The vertical expansion is inefficient and requires a greater degree of chamber expansion and chamber pressurization to achieve a comparable bending event.

The actuation resulting from pressurizing the interconnected channels in the freestanding chambers pneumatic network according to one or more embodiments is additive in the direction of the repeated sequence. Repeated channels need not be of the same geometry, and a network of channels comprising a number of channels with different geometries and orientations can therefore be used to create a complex movement, or change of the shape of a membrane upon pressurization.

As used herein, "stiffness" refers to the resistance of the elastic body to extension by an applied force. In general, elastic modulus is related to, but not the same as, stiffness. Elastic modulus is a property of the constituent material; stiffness is a property of a structure. That is, the elastic modulus is an intensive property of the material; stiffness, on the other hand, is an extensive property of the network and is dependent on the material modulus and the shape and boundary conditions. Because stiffness is a function of the Young's modulus, the material modulus can be used as a comparative measure of the relative stiffness of the channels walls and a predictor of deflection upon pressurization of the channel networks.

Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience strain or deformation first. As a result, the strain in the material of higher stiffness or greater elastic modulus is smaller or "limited." As used herein, the layer or wall of the channel that is stiffer, e.g., has a higher elastic modulus, is referred herein to the "strain limiting" layer or wall or membrane.

The size and shape of the chambers can be varied. Variable that can be varied include chamber height, thickness of the interior side walls, thickness of the top and exterior side walls, and number of chambers in the pneumatic actuator. Generally, increasing the number of chambers increases the curvature of actuation at a given pressure (due to additive effect of actuation of each individual chamber). Increasing chamber height reduces curvature of actuation at a given pressure. The chamber features can be curved, rounded or rectilinear.

Figure 3:
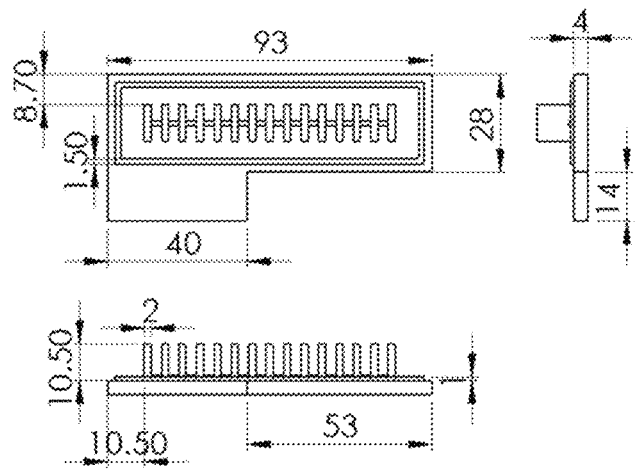
FIGS. 3A-3C are schematic illustrations in side and plan views of (A) an interior mold for the top layer of the freestanding pneumatic network; (B) an exterior mold for the top layer of the freestanding pneumatic network; and (C) a mold for the bottom layer of the freestanding pneumatic network, all three molds used to fabricate a low strain pneumatic network according to one or more embodiments.
Figure 3:
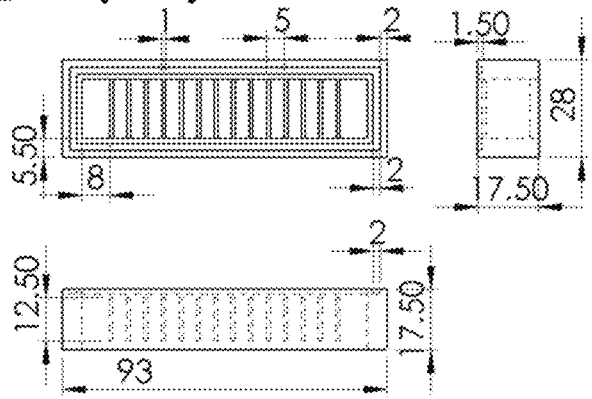
Figure 3:
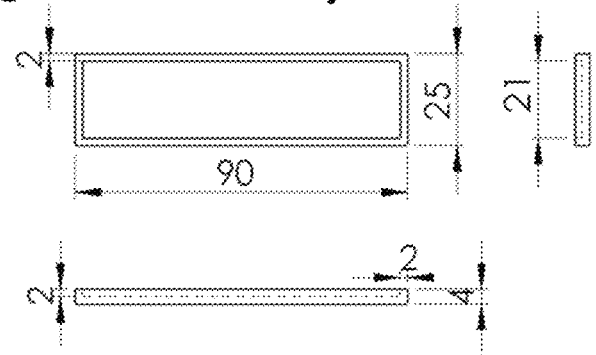

The side walls may be fully detached, meaning that adjacent chambers do not share any portion of the side walls. In other embodiments, the side walls can be semi-detached, namely, a portion of the side walls from adjacent chambers are connect and a portion is detached. Note that some portion of the side wall can be used to form the conduit joining adjacent chambers, Fabrication of Low Strain Pneumatic Networks Low strain pneumatic networks are made using a molding process. First, molds are made using a 3D printer based on a computer-aided-design (CAD) model. The actuator requires three molds: an interior and exterior mold for the top extensible layer, and a third mold for the bottom inextensible layer (FIGS. 3A-3C, shown in plain view and side and end cross-sectional views). The top interior mold as shown in FIG. 3B defines chambers that are connected by conduits so that all chambers inflate simultaneously. The connecting conduits have a smaller height (1 mm) so the chambers (10.5 mm), causing the chambers to expand preferentially when pressurized. Less force means less expansion. A channel with a smaller height has a smaller area and therefore experiences less force when under the same pressure than a larger channel. A mold aligning notch allows the exterior top mold and interior top mold to align when combined.

Figure 4:
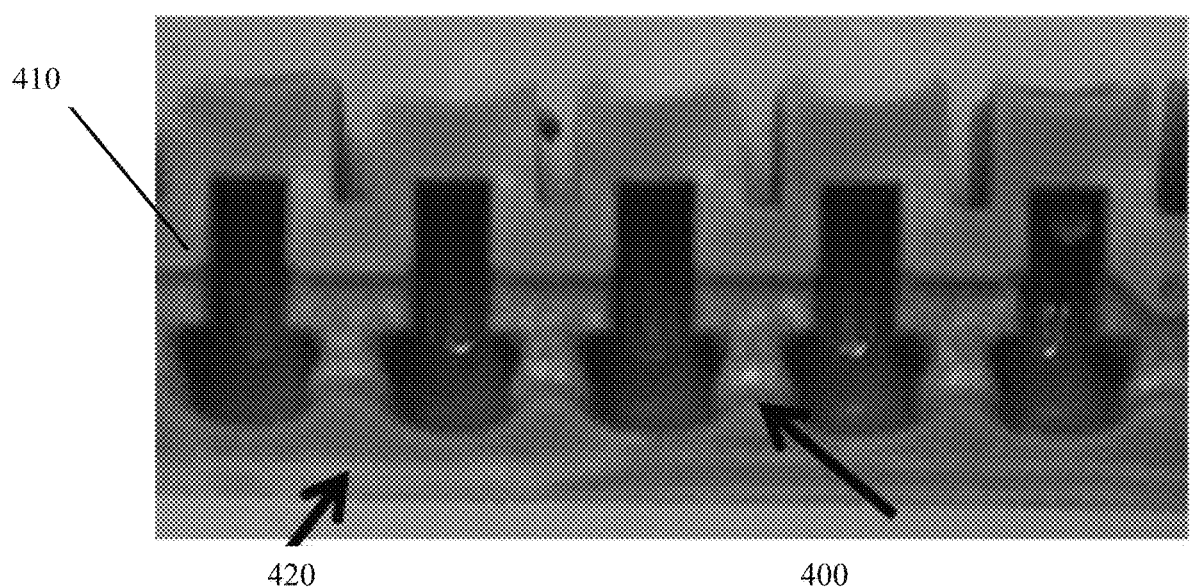
FIG. 4 is a photograph showing a cross-section of a freestanding art pneumatic network displaying the notch feature used to bond the extensible top layer to the inextensible bottom layer and the paper contained within the inextensible bottom layer.

The features of the exterior mold as shown in FIG. 3A consist of straight parallel plates that fit in between each chamber of the interior mold. The plates separate the elastomeric material between each chamber such that no two chambers share a wall. The exterior top mold defines the exterior walls and provides access to allow mold filling. The bottom layer is fabricated simply by pouring elastomer into the bottom mold as shown in FIG. 3C. A piece of paper or fabric can be embedded into the elastomer that serves as the inextensible layer to provide greater strain resistance. To ensure strong bonding of the actuator to its corresponding inextensible bottom layer extending features are molded into the bottom side of the top layer, referred to as notch 400 (FIG. 4). The notch features help prevent the connecting channels from clogging when bonding to the bottom layer. The notch features are not required if the two layers are carefully bonded. The top extensible layer 410 that is molded from the interior and exterior top mold is placed inside the bottom inextensible layer 420 before curing so that the elastomer is cured around the notch features 400 (FIG. 4).

The list of materials that can be used with this technique is extensive and encompasses elastomers such as latex, polyurethanes, silicones, vulcanized rubber for the extensible materials, and fabrics such as paper, Kevlar©, cotton, nylon, etc. for the strain limiting layer. Typically two types of elastomers, Ecoflex 30 and Elastosil M4601 are used; both are two-component silicone rubbers that vulcanize at room temperature. Ecoflex 30 is extremely soft (shore value of 00-30), while Elastosil M4601 is relatively stiff (shore A30.) In one observation, it was found that stiffer materials are less energy efficient but provide faster actuation. Paper, fibers mats and fabric may be used as the inextensible material embedded in the base to create the strain limiting layer. The choice of materials, coupled with the design of the chambers, determines the response of the device to pressure. The pressure necessary to achieve a particular amplitude of actuation scales with the stiffness of the materials. Each combination provides a different behavior in bending, upon actuation: for the same chamber geometry, the bending increases with increasing difference in elastic modulus between the elastomer and the strain limiting fabric (or layer).

Inlet holes are made using a biopsy punch at one end of the actuator. The size of the biopsy punch depends on the desired tubing to be inserted into the actuator, but typically ranges from 1-3 mm in diameter. Tubing should be of a slightly larger diameter than the inlet hole so an adequate seal will be made by the elastic force of the elastomer. In other embodiments, the soft robotic body is injection molded, in which case, inlets, outlets and conduits can be integrated into the soft robotic body.

Actuators are typically pressurized by compressed air or nitrogen supplied by gas tanks or a compressor. Hydraulic actuation is also performed using water supplied by a syringe pump. Alternatively, vacuum can be applied to bend the actuator slightly in the opposite direction.

Performance Characterization of Low Strain Pneumatic Networks

Figure 5:
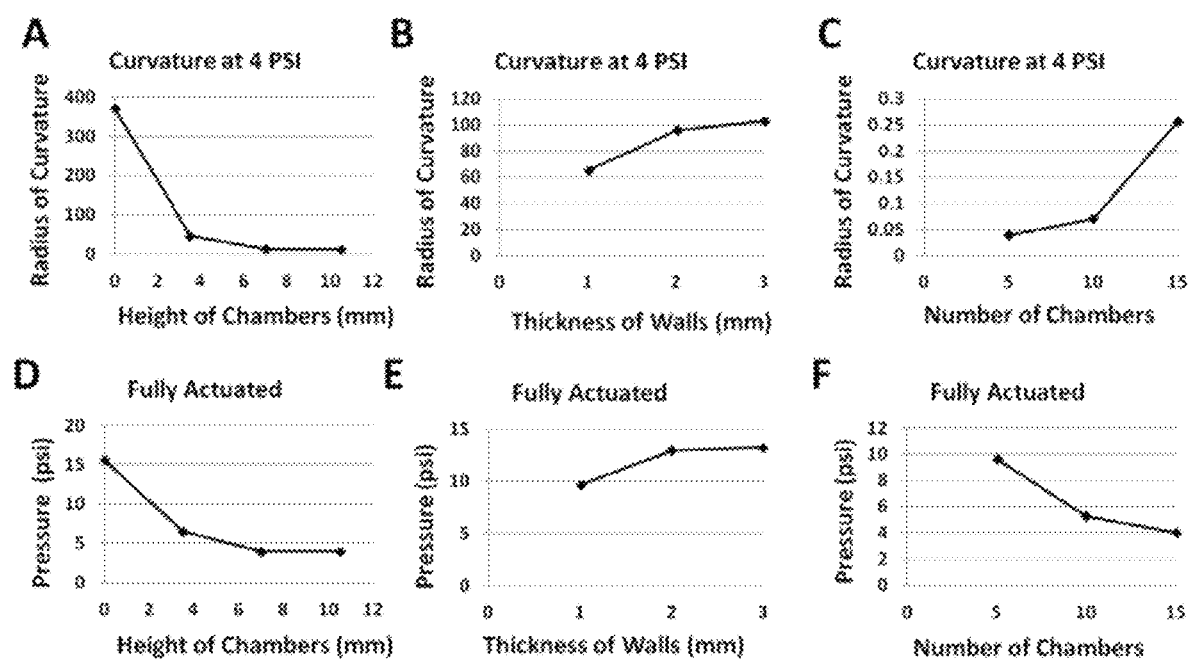
FIG. 5A-5C are plots of curvature of actuator when pressurized with 4 PSI v. height of chamber, thickness of walls and number of chambers, respectively; for A, an actuator with height of zero is an actuator containing a fully embedded chamber as shown in FIG. 2.
FIGS. 5D-5F are plots of curvature of actuator when pressurized with pressure required for each design to be fully actuated v. height of chamber, thickness of walls and number of chambers, respectively; for A, an actuator with height of zero is an actuator containing a fully embedded chamber as shown in FIG. 2.

A variety of chamber design parameters can be modified in order to change the actuation response in the pneumatic network. Exemplary parameters that can be varied to control the performance of the freestanding actuator include the number, height, and wall thickness of the chambers. The effect of these parameters on the performance of the actuator was evaluated by measuring the radius of curvature at 4 PSI and the pressure required to actuate the low strain pneumatic network to its full range of motion. The results are shown in FIGS. 5A-5C. FIGS. 5A-5C show curvature of the actuator when pressurized with 4 PSI for pneumatic actuators prepared using freestanding chambers having different chamber heights, wall thickness and number of chambers. FIGS. 5D-5F show the pressure required for each of these designs to be fully actuated. For FIGS. 5A and 5D, an actuator with height of zero is a point of comparison with an actuator having embedded chambers as illustrated in FIG. 2. An actuator is considered fully actuated when both ends of the actuator were in contact. A pressure gauge was connected to the actuator using tubing to provide a reading of internal pressure.

As is apparent from the results reported in FIG. 5A-C, the low strain pneumatic network bends more effectively (amount of bending at a given pressure) for actuators with an increasing number of chambers, increasing height of chambers, and decreasing thickness of the walls of the chambers. Increasing the number and height of chambers increases the surface area and therefore the force being applied to the actuator from the internal pressurized gas; decreasing the wall thickness lessens the force required to bend the actuator.

Increasing the heights of the chambers appears to have a plateau effect and therefore eventually taller chambers would only increase the actuator size, weight, and amount of material used without increasing the actuator's performance.

Comparison of Low Strain Pneumatic Networks to Embedded Chamber Pneumatic Networks An advantage of soft robots, over conventional hard robots, is that rapid prototyping allows new designs to be fabricated and tested quickly, in many cases, within a single day. Despite the advantages brought by rapid prototyping, a "trial and error" approach does not provide all the information necessary to make optimal design choices.

In designing this class of actuator, it is desirable to be able to predict the details of their non-linear response to pressure. A computer software generated finite element method (FEM) of the pneumatic network can help to understand the mechanisms controlling the behavior of these actuators, and can also be used as a tool for developing more efficient actuator designs.

For the actuator having unsupported (freestanding) chambers, preferential expansion of the chambers in the axis of bending is achieved by molding gaps into the exterior of the actuator so the chambers no longer share inside walls, and are only connected at the base of each expanding chamber (FIG. 1B). The chambers are designed so the two inside walls are thinner and have greater area than the other exterior walls of the chamber. This design causes preferential expansion of the inside walls, by minimizing outward, non-useful, expansion from stretching of the outside walls.

The performance of an actuator having unsupported chambers differs in several ways from an actuator having embedded chambers having otherwise similar properties, e.g., similar number of chambers, height of chamber, and wall thickness: i) the actuator having unsupported chambers bends more at a given pressure, ii) the actuator having unsupported chambers expands less when at its full range of motion, iii) the actuator having unsupported chambers exerts more force for a given pressure, iv) the actuator having unsupported chambers fatigues/fails less often.

The reason for these differences can be rationalized by considering the strain experienced by the actuator when pressurized. To estimate the strain experienced by both embedded actuators and actuators having unsupported chambers, a FEM using Abaqus 6.11-Simulia (Dassault Systems was employed). The FEM results show significantly more (~2.5×) strain (maximum principal or non-deformational) is experienced by the embedded chamber actuator as compared to the actuator having freestanding chambers for equivalent amplitude of motion. See, FIGS. 6A-6B and FIGS. 7A and 7B.

For the FEM model, the most critical aspect is properly modeling the non-linear elastomeric behavior of the silicone materials used (Elastosil M4601). Stress-strain curves were measured using pieces of cured Elastosil M4601 in the standard geometry (ASTM D638-IV) at a rate of 500 mm/min for tensile and compression testing. Compression and tensile data were plotted on one graph and fitted to the Yeoh hyperelastic material model in Matlab. Equation 1 is the fitting equation:

$$U = \sum_{i=1}^{N} C_{i0}(\bar{I}_1 - 3)^i + \sum_{i=1}^{N} \frac{1}{D_i}(J_{el} - 1)^{2i}.$$

where, n=3, I1 is the first strain invariant, J is the volume ratio, and constants Ci0 and Di are the coefficients fitted. Ci0 describes the shear behavior of the material, and Di introduces compressibility. Samples were assumed incompressible so Di was set to 0. The Yeoh model provided a good match to the experimental data.

The elastomeric components of the actuators are categorized within the FEM as solid elastomers, with the inextensible paper layers categorized as "shells". The embedded chamber actuator is comprised of 19,826 quadratic solid tetrahedral elements. The inextensible paper layer has a total of 738 quadratic triangular elements. The entire embedded chamber actuator is modeled using 31,622 nodes. Similarly, for the actuator having freestanding chambers, a total of 26,593 quadratic solid tetrahedral elements are used. The inextensible paper layer has a total of 845 quadratic triangular elements. This entire actuator is modeled using 44,637 nodes. The coefficients for the hyperelastic material properties are c1=0.11 and c2=0.02. An isotropic material type for the Elastosil was given a density of 1130 Kg/m$^3$.

Figure 6:
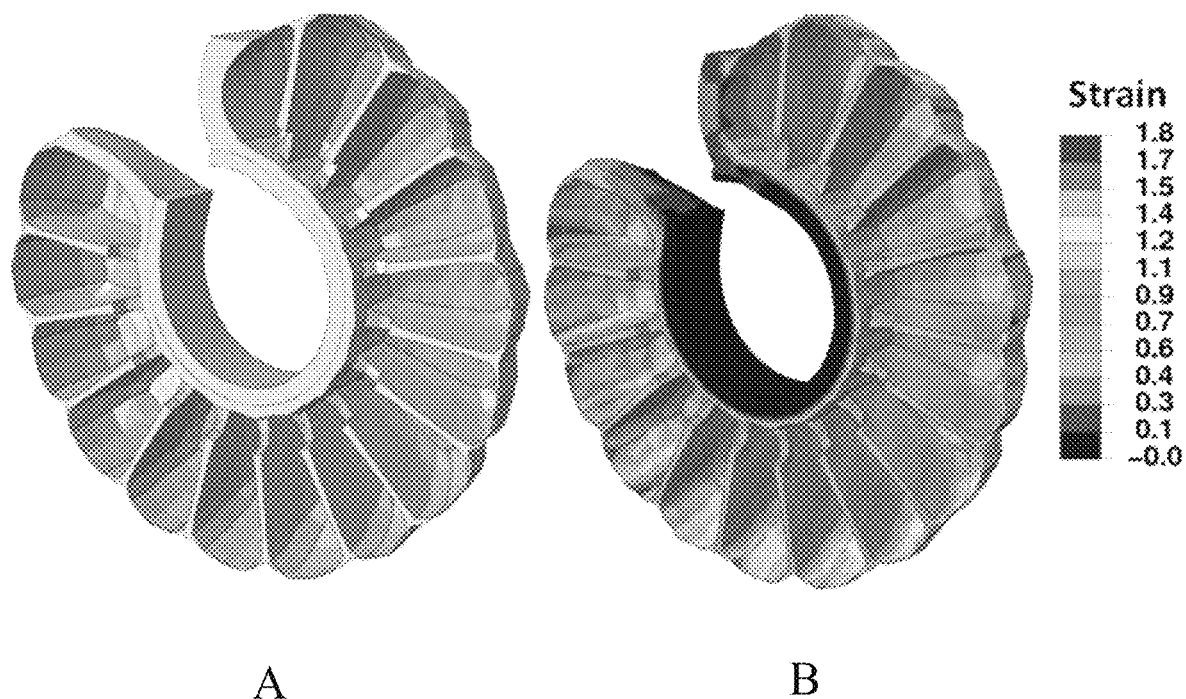
FIG. 6 is (A) a simulated image of the bending of an embedded actuator and (B) the levels of the maximum principal strain experienced by the actuator when fully pressurized.
Figure 7:
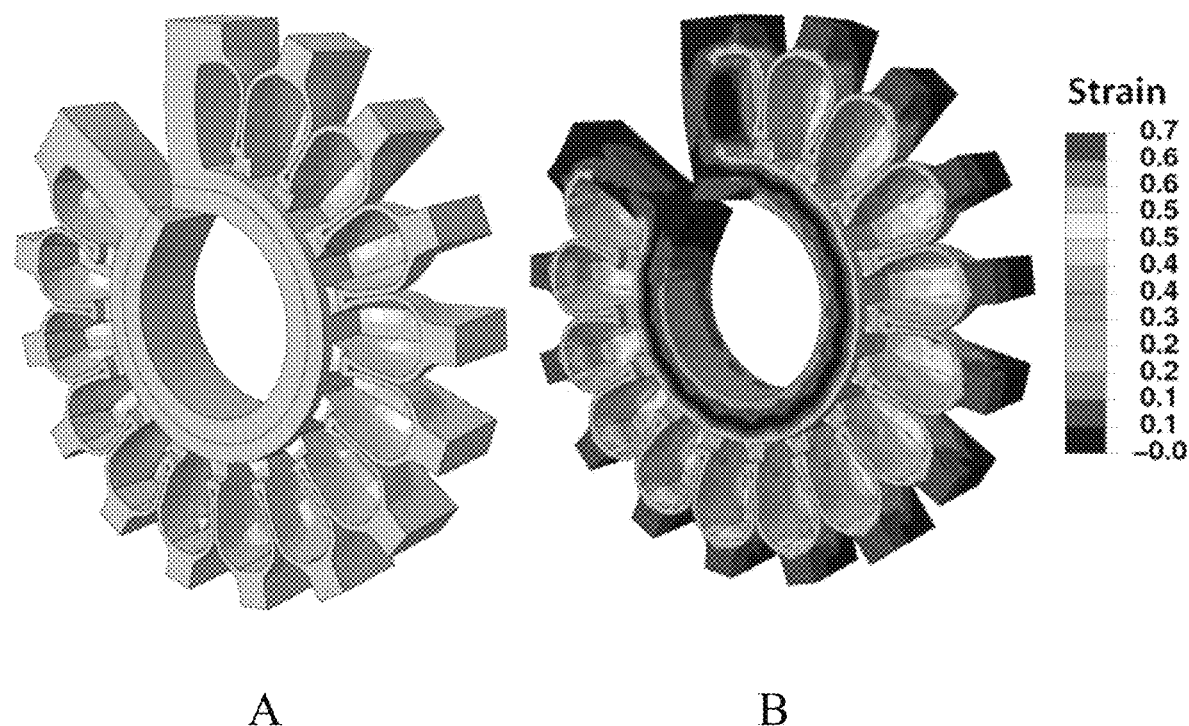
FIG. 7 is (A) a simulated image of the bending of an actuator having unsupported chambers and (B) the levels of the maximum principal strain experienced by the actuator when fully pressurized.

For the inextensible component (paper) a density of 750 Kg/m$^3$, a Young's Modulus of 6.5 GPa, and a Poisson's ratio of 0.2 were defined. In both FE models, the gravitational forces are accounted for and the fluid pressure is set to act on all internal faces of the cavities. The model was used to simulate the strain experienced by both the embedded and freestanding chambers in a pneumatic network upon pressurization, which are shown in FIGS. 6 and 7, respectively. These simulations suggest that the embedded chambers actuator requires ~2.5× the amount of tensile strain of the freestanding chambers actuator to achieve an approximately equal bend. The region of maximum strain has also relocated from the top wall in the embedded chamber actuator to the inside walls of the freestanding chambers actuator, which provides a more efficient bending.

There are two implications that suggest the freestanding chamber actuator is a better design than the embedded chamber actuator when intended for high-amplitude, rapid motion; i) The material of the freestanding chamber actuator will be less fatigued than that of the embedded actuator, since the freestanding chamber undergoes less strain per actuation; and ii) more rapid actuation can be achieved for a given flow rate of pressurized gas, since less internal pressure is required.

Figure 8:
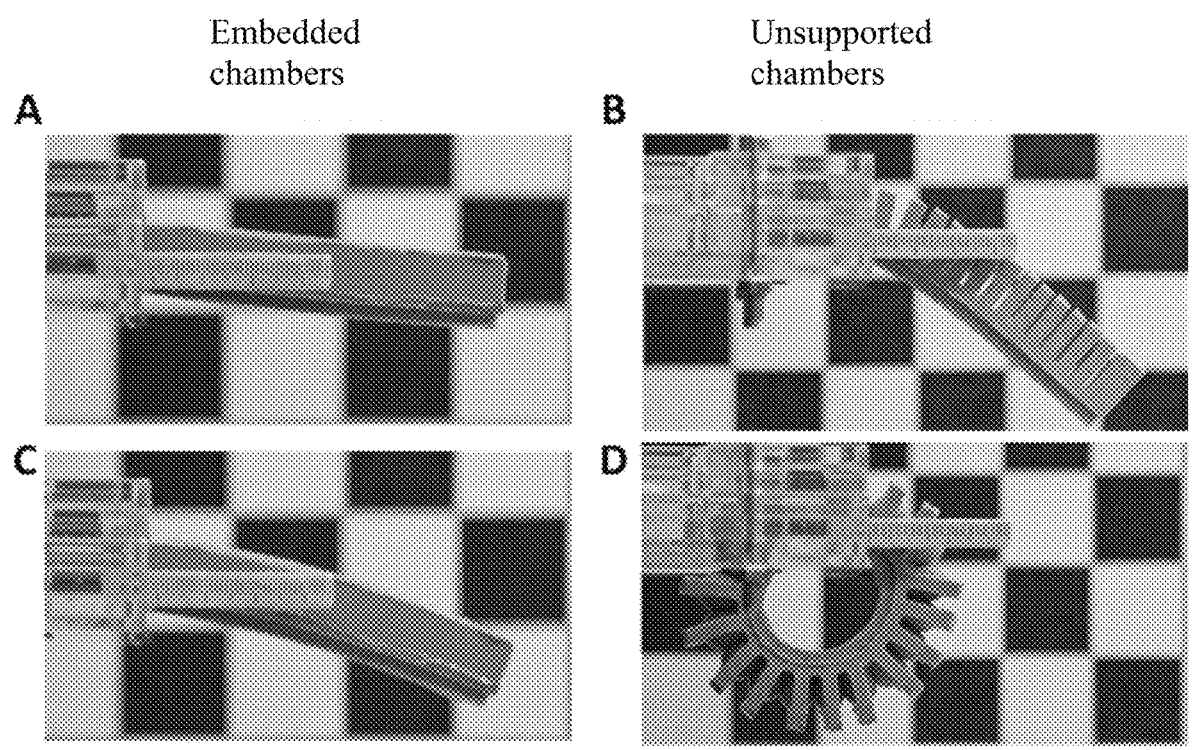
FIG. 8 is images of (A) an actuator having embedded chambers and (B) an actuator having freestanding chambers only under the force of gravity; images (C) an actuator having embedded chambers; (D) an actuator having freestanding chambers when pressurized to 72 kPA (10.44 psi) (B).

To confirm these results, the amount of pressure required to bend both an embedded chamber and a freestanding chamber actuator was determined. Both actuators were secured at one end and allowed to hang freely at the other. The actuator having freestanding chambers is much more compliant than the actuator having embedded chambers, since the individual expanding chambers are not held together by elastomer between the interior walls. This is illustrated in FIGS. 8A and 8B, respectively. Upon pressurization, the actuator having freestanding chambers reached its full range of motion (360°) at 72 kPA. See, e.g., FIG. 8D. At this pressure, the actuator having embedded chambers deflected only 41°. See, e.g., FIG. 8C.

Figure 9:
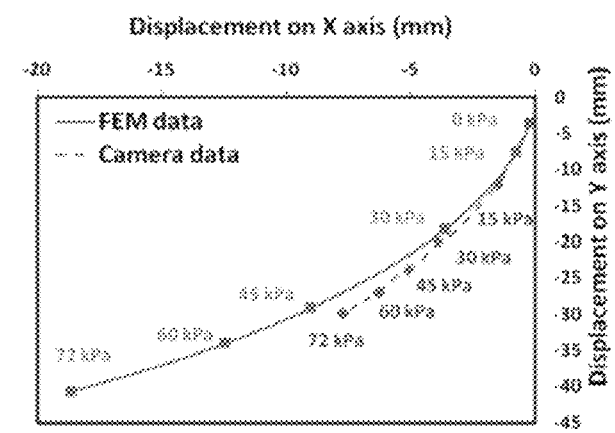
FIG. 9 is a plot of experimental and FEM trajectories of the free end of (A) an actuator having embedded chambers and (B) an actuator having freestanding chambers; and (C) a plot of the velocity profile of the free end of the an actuator having embedded chambers and the actuator having freestanding chambers when pressurized to 72 kPA (10.44 psi).
Figure 9:
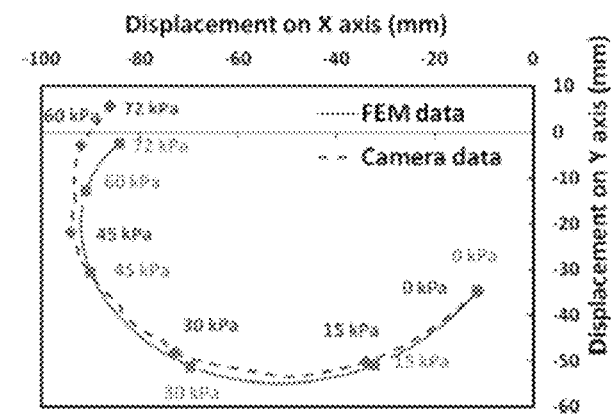
Figure 9:
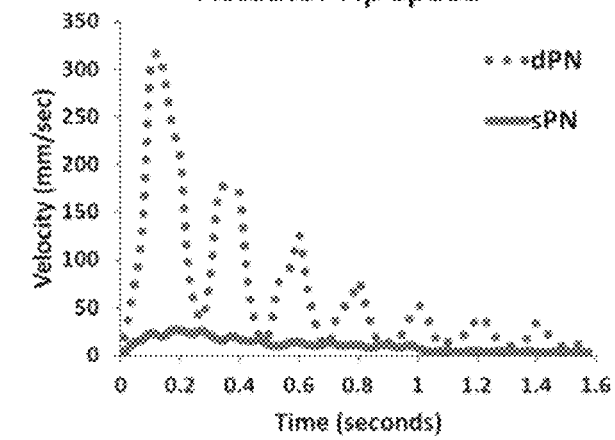

The speed by which a pneumatic network bends depends on its rate of pressurization (Pa·s$^{-1}$) and the net forces acting on it. The velocity of the tip of both low strain pneumatic networks (having freestanding chambers) and embedded chamber pneumatic networks was measured when pressurized to 72 kPa (10.44 psi), which is the pressure required to bend the actuators having freestanding chambers fully. The trajectory of the free end of the actuator was tracked using images taken from a camera and plotted them using a graph that allowed comparison of observed and FEM predicted positions. From both FIGS. 9A and 9B, the tight correlation between the FEM data and experimental data suggests that this class of FEMs can provide accurate predictions concerning the behavior of these soft actuators. The velocity of the tip of the actuators was calculated for each frame of the video and the velocity is reported in FIG. 9C. For this applied pressure, the actuator having freestanding chambers achieves significantly higher velocities than the embedded chamber actuator (maximum difference of ~16× and on average ~6×). The oscillations in the graph are attributed to gravity and the elastic recoil force of silicone structures.

Figure 10:
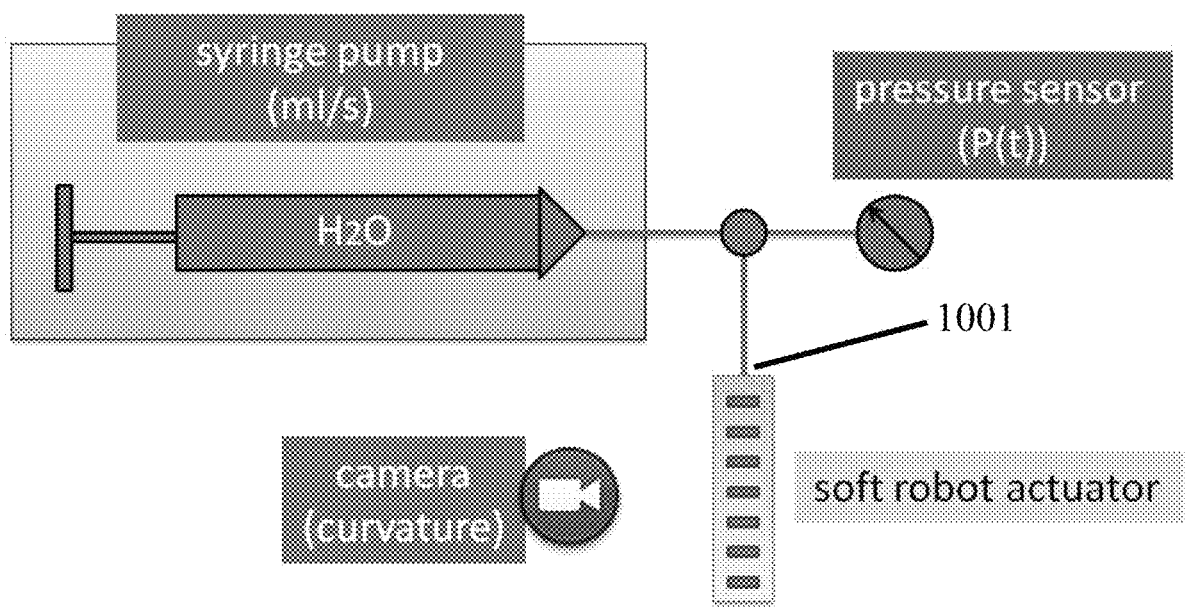
FIG. 10 is a schematic of the testing set up used to test the pressure response and durability of the low strain pneumatic network.

FIG. 10 shows the test set up used for generation of pressure-volume hysteresis curves. A programmable syringe pump infuses water to a T junction that is connected to a pressure sensor and the soft robotic actuator via an inlet 1001. Due to the incompressibility of the water, the infusion rate of the syringe pump is directly related to the volumetric changes of the pneumatic chambers of the actuator. Infusion rates are chosen slow enough to achiever quasistatic conditions. To minimize the effect to gravity, the actuator is suspended in water in a water tank. Both embedded chamber and unsupported chamber designs of the actuators were fabricated in Ecoflex 30 using a PDMS inextensible layer. The actuators were filled with water and hydraulically actuated so that a known volume could be measured using the displacement of the syringe pump. Within each test, the actuator was switched from inflation to deflation after the actuator had achieved full bending, which is considered to be when it had bent around to touch itself, forming a full circle. Once the actuator had completed a full cycle, it was inflated again. Changes from inflation to inflation provided information on hysteresis and fatigue. The area under the inflation curve represents energy input and the area under the deflation curve represents the energy recovered. Lost energy is the difference between the two curves.

Figure 11:
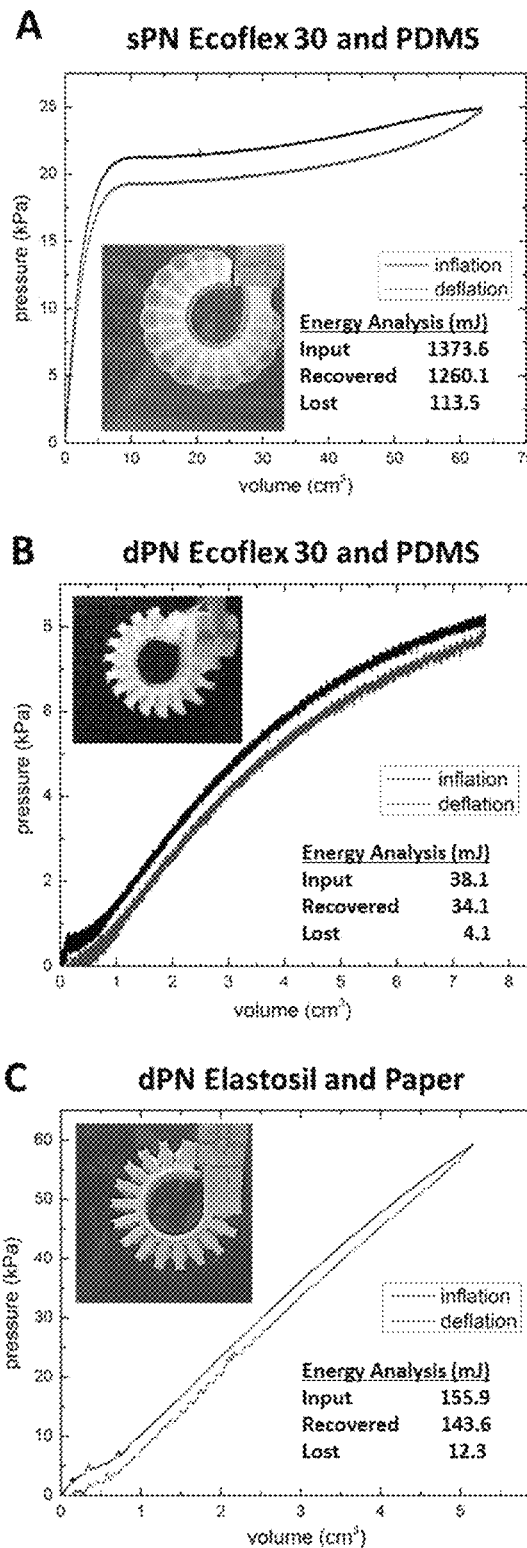
FIG. 11 is a series of pressure-volume hysteresis curves for (A) an actuator having embedded chambers and freestanding actuators according to one or more embodiments fabricated with an extensible layer made from Ecoflex 30 and an inextensible layer made from PDMS (B) and an extensible layer made from Elastosil M4601 and inextensible layer made from a composite of Elastosil M4601 and paper fabric (C).

FIGS. 11A and 11B show the pressure volume curves generated for embedded and freestanding actuators during this test, respectively. Actuators were made from Ecoflex 30 (for the extensible layer) and Sylgard 184 PDMS (for the inextensible layer). When using Ecoflex 30/PDMS as the elastomers, the results show the embedded pneumatic network requires ~3× higher pressure, ~8× higher volume, ~35× more energy than the freestanding pneumatic network to bend fully. In addition, during one actuation cycle, the embedded network dissipated nearly 30× more energy than the freestanding pneumatic network.

The reduction in volume that the freestanding chambers pneumatic network undergoes during inflation is advantageous for potential applications in space-limiting settings such as search-and-rescue and medical procedures (such as, minimally invasive surgery). The embedded chambers pneumatic network requires outward expansion of its extensible layer to bend, and any restrictions on the space available for its expansion could prevent proper function. The expansion of the extensible layer for the freestanding chambers pneumatic network, however, occurs largely within the space between each of its chambers, and thus allows it to fit into tighter spaces.

Control of the movement of the actuator is another important parameter characterizing performance. The embedded pneumatic network follows a non-linear relationship between pressure and volume, and is similar to a balloon in that volume increases but pressure is relatively stable after a threshold pressure (FIG. 11A). This non-linearity of the PV curve would make it difficult or impossible to monitor pressure to measure the degree of bending of the embedded pneumatic network. The freestanding pneumatic network, however, has a nearly linear PV curve; this quasi-linearity should allow predicting actuation by monitoring pressure (FIG. 11B). The freestanding pneumatic network therefore has the advantage of providing a complex non-linear output (i.e., a bending motion) with a simple near-linear input (i.e., pressure).

This same measurement was performed on actuators made out of a stiffer elastomer for the base (Elastosil M4601 Young's modulus of ~7 MPa, Shore A hardness 28) for the extensible layer. An actuator having freestanding chambers made from Elastosil M4601 as compared to the Ecoflex 30 (Young's modulus ~0.1 MPa, Shore A hardness 00-30) requires ~8× more pressure to fully bend, loses ~4× more energy for one cycle of bending and unbending, and requires ~1.5× less volume of water to fully bend. Compare, FIGS. 11B and 11C. These results suggest that softer materials exert less force, and bend more slowly for a given rate of inflation since the interior walls of the actuator have a greater extensibility for a given pressure. The increased strain of the inside walls causes forces to dissipate and the actuator to assume a larger volume.

One metric for the performance of elastomeric actuators is the life-span of the device in use; the life-span is limited by fatigue in the material. The number of full actuation cycles (each cycle consisting of nearly full bending and relaxing) that each type of actuator would withstand before bursting was measured. The same freestanding chambers actuator made out of Elastosil M4601 was tested for fatigue after being actuated up to 1 million times. The actuator was refilled with air, fixed at one end in air, and connected to a computer-controlled solenoid valve. Each cycle composed of a 100 ms pressurization period that fully bends the actuator (using a 15 psi (103 kPa) head pressure) and 400 ms of venting that was sufficient for the actuator to return to its original position.

Figure 12:
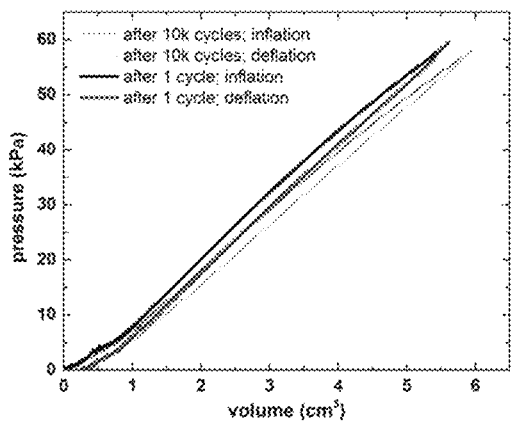
FIGS. 12A-12C shows pressure-volume hysteresis curves of freestanding actuators according to one or more embodiments before and after repeated pneumatic actuation.
Figure 12:
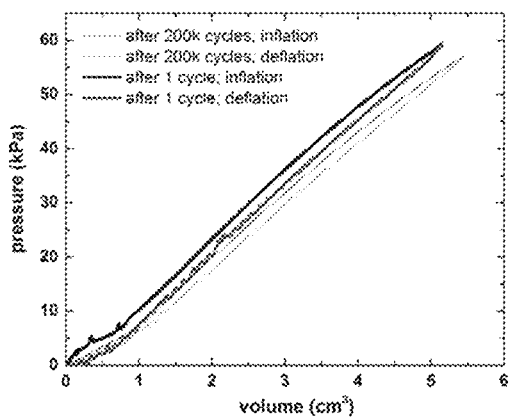
Figure 12:
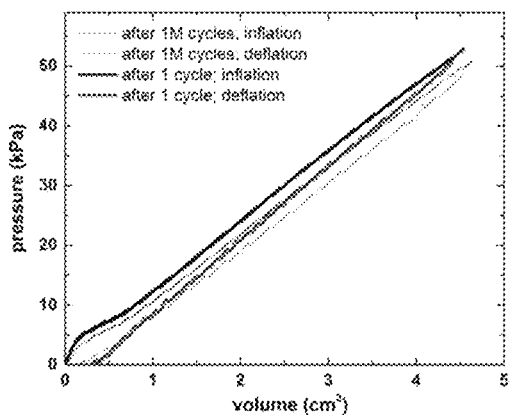

Fatigue of the material was assessed by measuring pressure-volume (PV) hysteresis curves for three separate freestanding chambers pneumatic networks, before and after subjecting them to cyclic testing (FIG. 12A-12C). The freestanding chambers pneumatic network did not fail after cyclic actuation at 2 Hz for $10^4$, $2\times10^5$, $10^6$ cycles of complete actuation. The PV curves do not change substantially over the $10^6$ cycles, suggesting that the performance was maintained. After 200,000 cycles, the actuator was still bending but there was a small tear in the base of the extensible layer in between two chambers. The actuator performed similarly as originally tested, and even lost ~30% less energy. The tear did not appear to leak any liquid within the range of pressures required to fully bend the actuator. After one million cycles, the slight decrease in slope, however, suggests that the actuator requires less pressure but more volume to fully bend, and thus the material extends more easily possibly due to conditioning of the polymers.

In contrast, the embedded actuator, tested in the same manner (actuated at 0.33 Hz), failed after ~46 cycles.

Rapid Actuation of Freestanding Chamber Pneumatic Networks

All previous experiments were purposefully performed with the actuators moving at relatively slow rates in order to better capture their movement using normal capture rates of our video camera. The speed of the actuators depends on the rate pressurized gas molecules can be transferred into the actuator.

To obtain higher flow rates of pressurized gas, the actuator having freestanding chambers was pressurized with a short pulse of high-pressure air (40 psi). The motion of the free end of the actuator moved at ~1 m/s over a distance of ~7 cm (measured using Image J software). Under similar conditions, the embedded chamber actuator burst. The resilience of the actuator having freestanding chambers according to one or more embodiments is due to the low strain needed for the actuator to bend.

To compare how rapidly the embedded and freestanding actuators bend, each actuator was pressurized with a miniature compressor (BTC-IIS, Parker, Holliss, N.H.) that delivers compressed air at pressures up to 193 kPa, at a maximum flow rate of ~11 L/min (Movie S2 and S3). Using this compressor, on average, the embedded chamber bends fully in 3.3 seconds (standard deviation of 0.54 s for N=7 actuations) and the freestanding chambers actuator bends fully in 130 ms (standard deviation of 8 ms for N=7 actuations).

Figure 13:
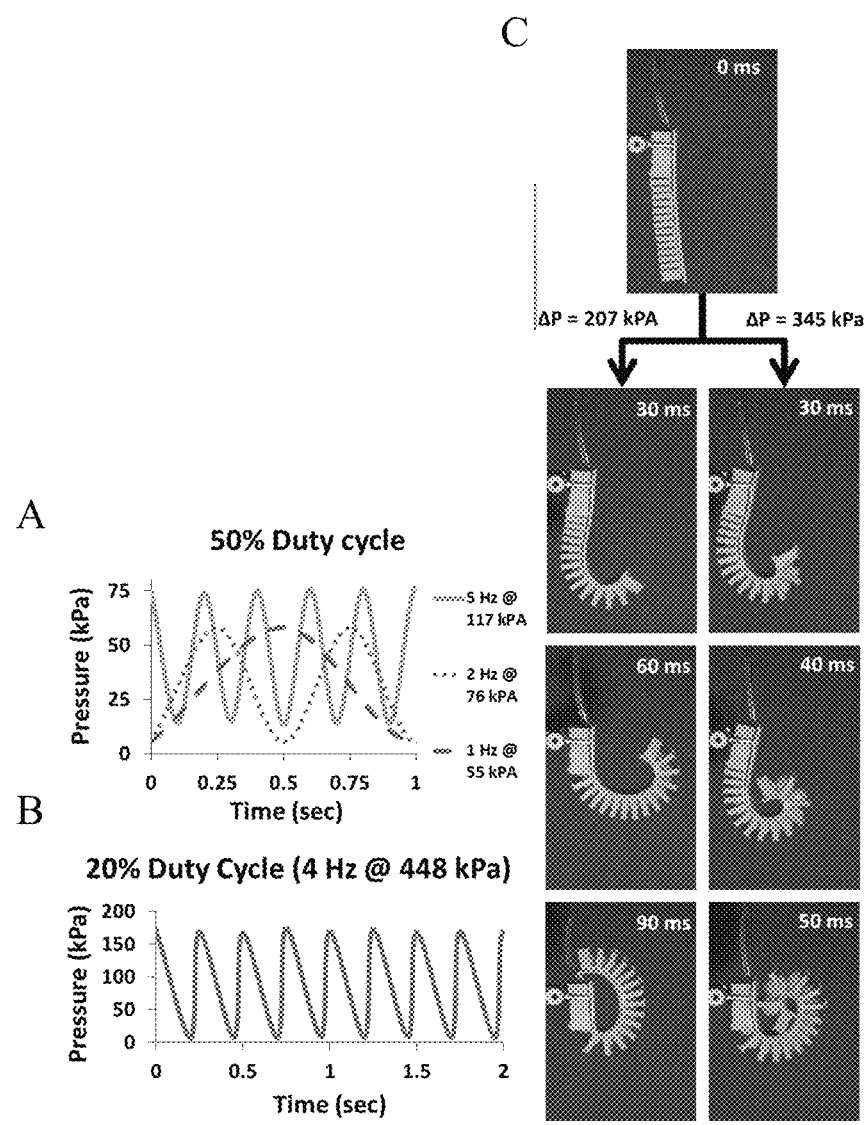
FIG. 13 shows (A) pressure profile for three frequencies with 50% duty cycles at pressures that cause full bending of the actuator; (B) Pressure profile for 20% duty cycles (50 ms pressurization, 200 ms venting) at 413 kPa that yields an actuation frequency of 4 Hz. time-lapse images of a low strain pneumatic network according to one or more embodiments pressurized with a pulse of 40 psi compressed air; and (C) are time-lapse images from high-speed videos of the dPN actuator when actuated with two different pressurization rates, illustrating that the actuator bends preferentially at its tip for the higher rate and more uniformly for the lower rate.

To determine the maximum frequency the freestanding chambers actuator could bend, a computer-controlled solenoid valve was used to pulse highly pressurized gas for short durations, and then vented the system to equilibrate with atmospheric pressure. The head pressure (that is, the pressure set by the regulator) was adjusted to achieve full bending of the actuator. The highest frequency of full bending and relaxing achieved by the freestanding chambers actuator, using a 50% duty cycle (equal durations of pressurizing and venting periods), was 2 Hz using 76 kPa head pressure. FIG. 13A is a pressure profile for three frequencies at 50% duty cycle, showing the pressure used to achieve full bending of the actuator; at 5 Hz frequency (solid line) 117 kPA was required, at 2 Hz (dotted line) 76 kPA was used and at 1 Hz (dashed line) 55 kPA was used. Higher frequencies did not allow the actuator to return to its original position. A duty cycle with a shorter pressurization period (50 ms using 448 kPa head pressure) and a longer venting period (200 ms) achieved an overall higher frequency (4 Hz) of actuation, as shown in FIG. 13B.

The freestanding chambers actuator showed an interesting bi-modal behavior; the change between modes occurs above ~200 kPa head pressure. For slower rates of actuation, the chambers of the pneumatic network inflate relatively evenly, and the actuator bends along a roughly circular trajectory. Above the threshold rate, however, the tip of the actuator bends preferentially, and causes the actuator to curl on itself. The embedded chambers actuator, in contrast, was only observed to provide the second mode of bending (i.e. it curls on itself) since each chamber always undergoes a snap-through instability. The actuation pathway of the same actuator under two different pressures (ΔP=207 kPA and 345 kPA) is shown in the time lapse photo series of FIG. 13C.

Force Exerted by Actuators Having Freestanding Chambers

Using a transducer (Nano 17, 6 axis F/T sensor, ATI industries), the force exerted by the tip of the actuator was measured in order to understand how much force these actuators exert for a given pressure. The actuator having freestanding chambers was secured at one end and the transducer was placed beneath the tip of the opposite end. The data plotted in FIGS. 13A and 13B show a tight correlation between the FEM and experimental data for the applied pressures.

Figure 14:
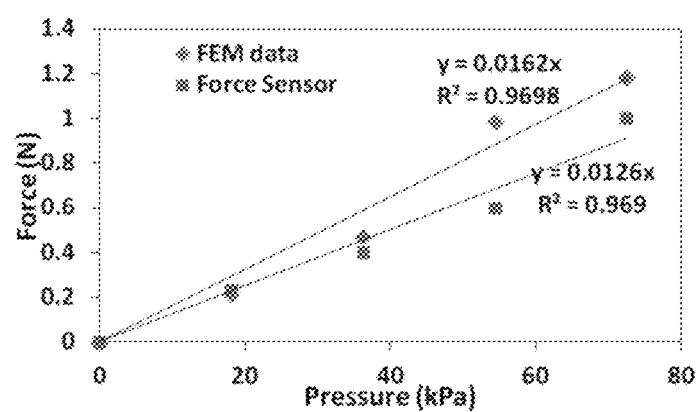
FIG. 14 is a plot of force (N) vs pressure (kP) for (A) of an embedded chamber pneumatic network and (B) a freestanding chamber pneumatic network to simulate force exerted at tip for several pressures; plot includes data from both a FEM model simulated and experimental measurements.
Figure 14:
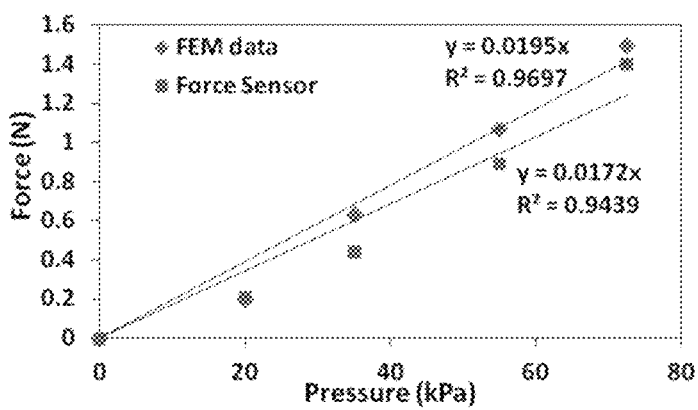

The actuator having freestanding chambers is able to apply a force of ~1.4N for 72 kPa (pressure that provides full range bending for the actuator having freestanding chambers). At 72 kPa, the embedded chambers actuator applies a force of ~1N; that is, 40% less than that of the actuator having freestanding chambers. Compare, FIGS. 14A and 14B. Although this demonstrates that for a given pressure of up to 72 kPA, the actuator having freestanding chambers design exerts more force than the embedded chambers design, the embedded chambers actuator would exert more force at its maximum curvature, however this does require significantly higher pressures. For a given material, the embedded chambers actuator can exert more force than the actuator having freestanding chamber at its own respective bending pressures for maximum bending. Thus, the embedded actuator and the actuator having freestanding chambers may find optimal use in different applications.

In one or more embodiments, the range of exerted forces of the actuator, however, can be tuned by selecting elastomers of different stiffness. Both silicones and polyurethanes are commercially available with a large range of material properties. Therefore a low strain pneumatic network can be made with higher modulus materials in order to achieve higher or lower forces as desired.

Keyboard Playing Low Strain Pneumatic Networks

At least one class of applications for soft robots will require high dexterity and good control of pressure, yet use minimal controls. As an example of such a task, we built a set of actuator fingers to play an electronic keyboard. To play the keyboard in a way that mimics a human hand, the actuators require sufficient speed to maintain a desired tempo, and sufficient force (0.65 N) to depress the keys. The portion of the actuator that contacts the key weighs ~4.5 g and, therefore, its gravitational weight can only produce a maximum of 0.045 N of force. Therefore the remaining force (0.605 N) required to depress a key must come from the bending force of the actuator which comprise the internal pressure acting on the actively bending region of the actuator and the acceleration of that bending region.

A solenoid valve was used to control whether the actuator was pressurized with compressed air (15 psi was the maximum pressure of our control system) or vented to atmosphere. Each solenoid valve was connected to an actuator via tubing (21 cm long and 3.5 mm in diameter) and a needle (16 gauge). The actuator hit the key ~100 ms after opening the valve; to do so, its tip traveled a distance of ~2.6 cm, yielding a momentum of ~13×10−4 N−s and a force of ~0.005N.

Figure 15:
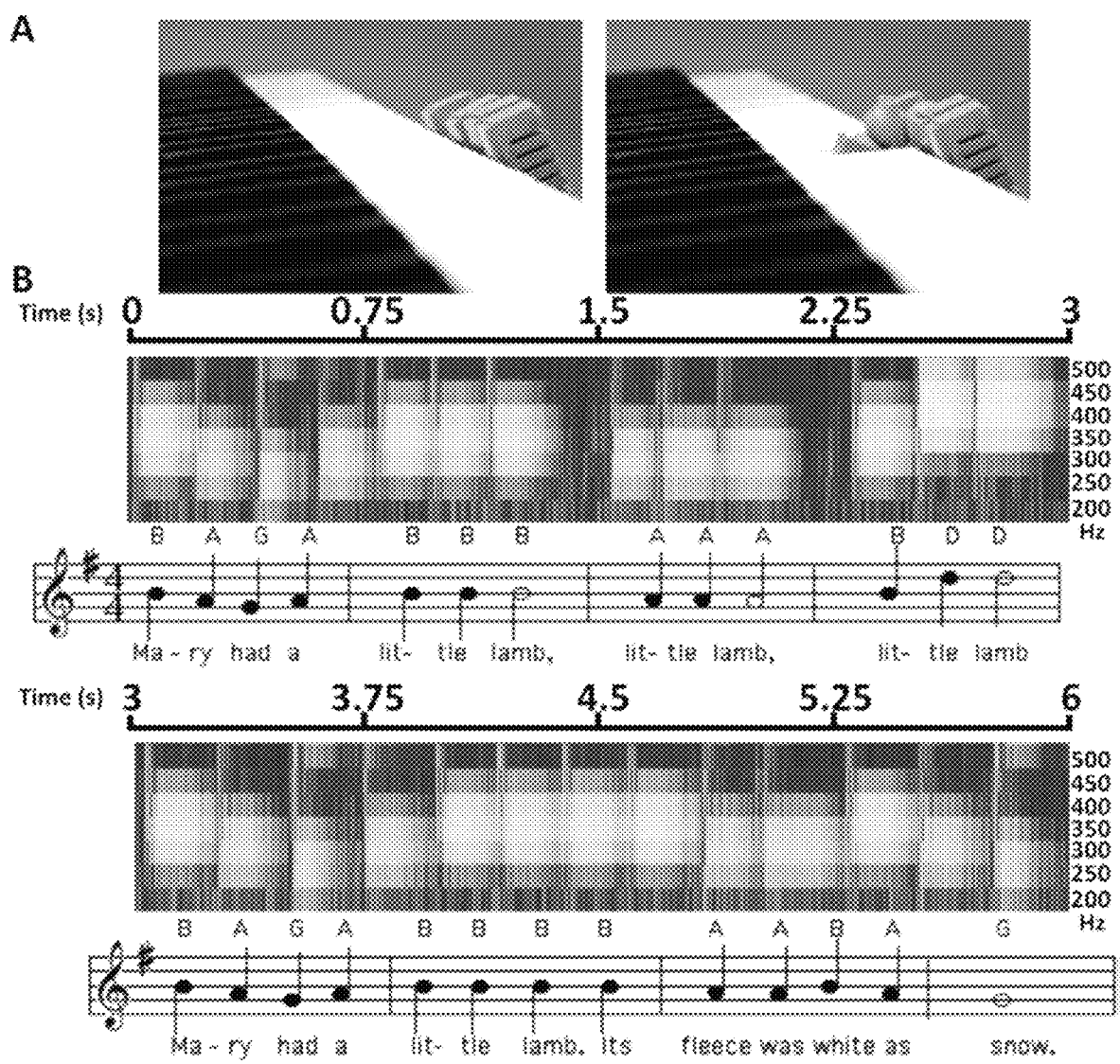
FIG. 15 illustrates independent output control for a low strain pneumatic network according to one or more embodiment; (A) Images of four actuators having freestanding chambers playing a digital keyboard in which each actuator is actuated for 75 ms at 15 PSI (103 KPa, 1 bar) (except for repeated notes, which are actuated with 50 ms) and vented for 150 ms and (B) is a spectrum analysis of the audio file for frequencies between 200 and 500 Hz.

To demonstrate the precision and speed of the low strain pneumatic networks according to one or more embodiments, we used four actuators to play "Mary Had a Little Lamb" on the keyboard, which is shown in FIG. 15A. In some embodiments, the four actuators having freestanding chambers can be affixed on the keyboard using Velcro and can be actuated with air using computer-regulated solenoid valves. In some embodiments, the actuators can be coupled together using a connector. The connector can include a plurality of fluidic inputs and a pressurizing inlet. The pressurizing inlet can be configured to receive fluid, and one of the actuators can be reversibly attached to one of the plurality of fluidic inputs. Each note was played by pressurizing one of the actuators for 75 ms with a head pressure of 15 psi, and then venting them for 150 ms. For notes played in succession (the same actuator pressurized twice), we used a 50 ms pressurization time so the actuator would release the key more quickly (alternatively, a longer venting time could have been used but would have resulted in a slower tempo).

FIG. 15B shows the spectrum analysis of the audio file. The notes played by the actuator match those of the song and are clearly resolved, demonstrating the precision of these actuators. The entire two staves play within 6 seconds, and three notes play in as little as 0.4 seconds. To play songs with shorter intervals between notes, we could increase the flow rate of air by using higher pressures (>15 psi), larger diameter tubing (>3.5 mm), faster venting mechanisms (i.e., vacuum driven venting, integrated venting holes), and better positioning of the actuators.

The performance of freestanding chamber pneumatic networks has been demonstrated in several aspects: i) speed achieved for a given rate of inflation, ii) force exerted for a given pressure, iii) change in volume required for a given degree of bending, iv) number of actuation cycles before failing, and v) correlation between the pressure in the pneumatic network and its degree of bending without a load.

Specifically, the improved speed (25×) and force (1.4×) of the freestanding chamber pneumatic network is useful for creating soft robots that move quickly and can exert higher forces. Alternatively, one could actuate a freestanding chamber pneumatic networks with a smaller compressor and obtain similar performance than a larger compressor, the advantage being a reduction in the overall size and power-consumption of the robot (an option particularly useful for untethered applications).

The reduced change in volume (8× smaller than the embedded chambers pneumatic network) minimizes fatiguing of the material, and thus improves the durability of the freestanding chamber pneumatic network to such a level that the actuator does not fail within a million cycles of full bending. This high durability could allow its use in long-term applications, and when high margins of safety are required for high-consequence uses (such as in medical procedures). Furthermore, since the freestanding chamber pneumatic network expands into the space between the chambers, the actuator assumes a smaller volume upon inflation potentially allowing it to enter smaller spaces; this is an attribute beneficial for applications in search-and-rescue and minimally invasive surgery.

In addition to improving the performance (i.e., speed and force) of the freestanding chamber pneumatic network, the rate of actuation (as opposed to the geometry of the actuator) could determine the motion of a pneumatic network. The bi-modal bending behavior that occurs at high speeds may provide interesting opportunities for control schemes by allowing at least two types of motion from a single design, simply by changing the rate of pressurization.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

The invention claimed is:

1. An actuator, comprising:
   a base comprising a strain limiting layer;
   a plurality of unsupported chambers secured to the strain limiting layer, each chamber having interior side walls, exterior side walls, and a top wall, wherein the unsupported chambers do not share a common wall along a portion of the interior side walls;
   a channel that fluidically interconnects the plurality of chambers; and
   an inlet port for receiving a pressurizing fluid, wherein the interior side walls expand a greater amount relative to the exterior side walls and the top wall upon pressurization of the chambers to cause bending of the actuator around the strain limiting layer and cause said portion of the interior walls to touch each other.

2. The actuator of claim 1, wherein the exterior walls include exterior side walls having a thickness that is greater than a thickness of the interior side walls.

3. The actuator of claim 1, wherein the exterior walls include top walls having a thickness that is greater than a thickness of the interior side walls.

4. The actuator of claim 1, wherein the exterior walls are made from a materials having a greater stiffness than the interior side walls.

5. The actuator of claim 1, wherein the strain limiting layer comprises an inextensible, flexible layer.

6. The actuator of claim 5, wherein the strain limiting layer comprises an inextensible layer embedded in a layer of flexible polymer.

7. The actuator of claim 6, wherein the inextensible layer comprises a paper, a fabric or a polymer film.

8. The actuator of claim 7, wherein the paper or the fabric is provided as a matted sheet, a woven sheet or a fiber aligned along the length of the strain limiting layer.

9. The actuator of claim 1, wherein the strain limiting layer comprises an extensible, flexible material that is configured and arranged to be stiffer than the exterior walls of the chambers.

10. The actuator of claim 1, wherein the plurality of chambers are comprised of an elastomer.

11. The actuator of claim 1, wherein the actuator is powered by pressure provided by a gas or liquid source.

12. The actuator of claim 1, wherein the channel is positioned between the interior sidewalls of the plurality of chambers.

13. The actuator of claim 1, wherein the channel is located in the strain limiting layer and is positioned and arranged to fluidically connect the plurality of chambers.

14. The actuator of claim 1, wherein greater than 25% of the surface area of the interior side wall of the first chamber is separated from the interior side wall of the second chamber.

15. A method of actuation comprising:
    providing the actuator according to claim 1; and
    pressurizing the actuator to cause the actuator to actuate from a first resting position to a second actuated position.

16. The method of claim 15, wherein pressurizing causes the interior side walls to expand preferentially compared to the exterior walls.

17. The method of claim 15, wherein the actuation occurs in less than 1 second.

18. The method of claim 15, wherein the actuation occurs in less than 250 msec.

19. The method of claim 15, wherein the actuation occurs in less than 100 msec.

20. The method of claim 15, wherein the actuation is greater than 1 m/sec.

21. The method of claim 15, wherein the actuator undergoes a circumferential-expansion of less than 3% during the actuation.

22. The method of claim 15, wherein the actuator undergoes an energy loss of less than 10% between the actuated and unactuated state.

23. The method of claim 15, wherein the actuator is configured to be cycled more than 10000 times without failure.

24. The method of claim 15, wherein the actuator is configured to be cycled more than 200000 times without failure.

25. The method of claim 15, wherein the actuator is configured to cycle more than one million times without failure.

26. The method of claim 15, wherein the frequency of actuation is greater than 1 Hz.

27. The method of claim 15, wherein the frequency of actuation is greater than 2 Hz.

28. The method of claim 15, wherein the actuator bends along a circular trajectory below a threshold actuation rate and the tip of the actuator bends preferentially, causing the actuator to curl on itself above a threshold actuation rate.

29. A soft robot comprising:
    a plurality of soft actuators according to claim 1; and
    a connector having a plurality of fluidic inputs and a pressurizing inlet, wherein the pressurizing inlet is configured to receive fluid, and the inlet port of one of the plurality of soft actuators is reversibly coupled to one of the plurality of fluidic inputs.

30. The actuator of claim 1, wherein the inlet port is coupled to a solenoid valve that is configured to control whether the actuator is pressurized with compressed air or vented to atmosphere.

31. The actuator of claim 30, wherein the solenoid valve is coupled to the inlet port via tubing.

32. The actuator of claim 1, wherein the plurality of chambers are secured to the strain limiting layer along one face.

* * * * *